(12) United States Patent
Baran (10) Patent No.: US 10,423,164 B2
(45) Date of Patent: Sep. 24, 2019

(54) OBJECT POSITION MEASUREMENT WITH AUTOMOTIVE CAMERA USING VEHICLE MOTION DATA

(71) Applicant: Robert Bosch GmbH, Stuttgart (DE)

(72) Inventor: Matthew Baran, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 15/564,788

(22) PCT Filed: Mar. 1, 2016

(86) PCT No.: PCT/US2016/020255
§ 371 (c)(1),
(2) Date: Oct. 6, 2017

(87) PCT Pub. No.: WO2016/164118
PCT Pub. Date: Oct. 13, 2016

(65) Prior Publication Data
US 2018/0181142 A1 Jun. 28, 2018

Related U.S. Application Data

(60) Provisional application No. 62/145,692, filed on Apr. 10, 2015.

(51) Int. Cl.
*G05D 1/02* (2006.01)
*B62D 15/02* (2006.01)
(Continued)

(52) U.S. Cl.
CPC ............ *G05D 1/0253* (2013.01); *B60D 1/36* (2013.01); *B60D 1/62* (2013.01); *B60R 1/003* (2013.01);
(Continued)

(58) Field of Classification Search
CPC ........ G05D 1/0253; G06T 7/579; G06T 7/246
See application file for complete search history.

(56) References Cited

U.S. PATENT DOCUMENTS 6,483,429 B1 11/2002 Yasui et al.
7,379,018 B1 5/2008 Lohmeier et al.
(Continued)

FOREIGN PATENT DOCUMENTS

CN 104159757 A 11/2014
CN 104346943 A 2/2015
(Continued)

OTHER PUBLICATIONS

Notice of Preliminary Rejection from the Korean Intellectual Property Office for Application No. 10-2017-7028245 dated Jul. 5, 2018 (7 pages).
(Continued)

*Primary Examiner* — Adam M Alharbi
(74) *Attorney, Agent, or Firm* — Michael Best & Friedrich LLP (57) ABSTRACT

A method and system of locating a position of an object with an omnidirectional camera affixed to a vehicle. An electronic control unit receives movement data of the vehicle from a vehicle communication bus. Simultaneously, the electronic control unit receives a plurality of omnidirectional image frames of a stationary object with the omnidirectional camera. Based on the received omnidirectional image frames, the electronic control unit identifies an object of interest in the omnidirectional image frames and tracks the object of interest in the omnidirectional image frames while the vehicle is moving. The electronic control unit determines a change in position of the object of interest in the omnidirectional image frames as the vehicle is moving and determines a distance to the object of interest based on the change
(Continued)

of position of the vehicle and the change in position of the object of interest in the omnidirectional image frames.

20 Claims, 12 Drawing Sheets (51) Int. Cl.
*G01C 3/10* (2006.01)
*G01C 11/04* (2006.01)
*G01C 11/06* (2006.01)
*B60D 1/36* (2006.01)
*B60D 1/62* (2006.01)
*G06T 7/579* (2017.01)
*G06T 7/246* (2017.01)
*B60R 1/00* (2006.01)

(52) U.S. Cl.
CPC ......... *B62D 15/0285* (2013.01); *G01C 3/10* (2013.01); *G01C 11/04* (2013.01); *G01C 11/06* (2013.01); *G06T 7/246* (2017.01); *G06T 7/248* (2017.01); *G06T 7/579* (2017.01); *B60R 2300/302* (2013.01); *B60R 2300/808* (2013.01); *B60R 2300/8066* (2013.01); *G06T 2207/20101* (2013.01); *G06T 2207/30252* (2013.01)

(56) References Cited

U.S. PATENT DOCUMENTS

| | | |
|---|---|---|
| 7,792,330 B1 | 9/2010 | Lowder et al. |
| 8,063,752 B2 | 11/2011 | Oleg |
| 8,199,975 B2 | 6/2012 | Pomerleau et al. |
| 2003/0146869 A1 | 8/2003 | Lin et al. |
| 2004/0189454 A1 | 9/2004 | Shimoyama |
| 2009/0148036 A1 | 6/2009 | Aoyama |
| 2012/0140076 A1 | 6/2012 | Rosebaum et al. |
| 2013/0162785 A1 | 6/2013 | Michot et al. |
| 2013/0026390 A1 | 8/2013 | Luo et al. |
| 2013/0226390 A1 | 8/2013 | Luo et al. |
| 2014/0055616 A1 | 2/2014 | Cororan et al. |
| 2014/0085409 A1 | 3/2014 | Zhang et al. |
| 2015/0249821 A1 | 9/2015 | Tanizumi et al. |
| 2017/0050743 A1* | 2/2017 | Cole ............... B64D 43/00 |
| 2018/0181142 A1* | 6/2018 | Baran ............... B60D 1/62 |
| 2018/0201187 A1* | 7/2018 | Yellambalase ........ B60Q 9/00 |

FOREIGN PATENT DOCUMENTS

| | | |
|---|---|---|
| CN | 104417546 A | 3/2015 |
| DE | 102005022882 A1 | 11/2006 |
| JP | 2000161915 A | 6/2000 |
| JP | 2001187553 A | 7/2001 |
| JP | 2005056295 A | 3/2005 |
| JP | 2009139246 A | 6/2009 |
| JP | 2009180536 A | 8/2009 |
| JP | 2010014443 A | 1/2010 |
| JP | 2011087308 A | 4/2011 |
| JP | 2011217300 A | 10/2011 |
| JP | 2013534616 A | 9/2013 |
| JP | 2014106176 A | 6/2014 |
| JP | 2014169184 A | 9/2014 |
| WO | 2004004320 A1 | 1/2004 |
| WO | 2014116485 A1 | 1/2014 |
| WO | 2014116485 A1 | 7/2014 |

OTHER PUBLICATIONS

International Search Report and Written Opinion for Application No. PCT/US2016/020255 dated Oct. 13, 2016, (29 pages).
International Preliminary Report on Patentability for Application No. PCT/US2016/020255 dated Oct. 19, 2017 (23 pages).
Notice of Final Rejection from the Korean Intellectual Property Office for Application No. 10-2017-7028245 dated Jan. 24, 2019 (2 pages).
First Office Action from the National Intellectual Property Administration, P.R. China for Application No. 201680020729.2 dated Feb. 2, 2019 (15 pages).
Office Action from the Japanese Patent Office for Application No. 2017-553142 dated May 8, 2019 (8 pages).

* cited by examiner

OBJECT POSITION MEASUREMENT WITH AUTOMOTIVE CAMERA USING VEHICLE MOTION DATA

CROSS-REFERENCE TO RELATED CASES

This application claims the benefit of U.S. Provisional Patent Application No. 62/145,692 filed on Apr. 10, 2015, the entire contents of which are incorporated herein by reference.

BACKGROUND

Embodiments of the present invention relate to vehicle imaging systems.

SUMMARY

The object position measurement system detects, tracks, and calculates position of objects of interest as viewed by an omnidirectional camera on a vehicle. The object position measurement system uses an electronic control unit that identifies and estimates structure (i.e., points in the world) based on motion of the vehicle. The system uses odometric information provided by vehicle controllers communicating over a vehicle communication bus. In addition, the object position measurement system includes a controller to estimate world structure based on images from a single wide field of view camera. The controller uses the world structure and the odometric information to allow the vehicle to perform driver-assist and automated maneuvers.

In one embodiment, the invention provides a method of locating a position of an object with an omnidirectional camera affixed to a vehicle. An electronic control unit receives movement data of the vehicle from vehicle sensors indicative of a change of position of the vehicle. The electronic control unit receives a plurality of omnidirectional image frames of one or more stationary objects with an omnidirectional camera and identifies an object of interest based on the one or more stationary objects in the omnidirectional image frames. The electronic control unit tracks the object of interest in the omnidirectional image frames while the vehicle is moving. The electronic control unit determines a change in position of the object of interest in the omnidirectional image frames as the vehicle is moving. Based on the change of position of the vehicle and the change in position of the object of interest in the omnidirectional image frames, the electronic control unit determines a distance to the object of interest.

In another embodiment the invention provides an object locating system for locating a position of an object with an omnidirectional camera affixed to a vehicle. The system includes at least one vehicle sensor configured to indicate a change of position of the vehicle, an omnidirectional camera, and a user interface configured to display video information to a driver of the vehicle. The system also includes an electronic control unit configured to receive a plurality of omnidirectional image frames from the omnidirectional camera including an omnidirectional image of one or more stationary objects. The electronic control unit also receives movement data of the vehicle from the at least one vehicle sensor indicative of a change of position of the vehicle. The electronic control unit identifies an object of interest from the one or more stationary objects in the omnidirectional image frames and tracks the object of interest in the plurality of omnidirectional image frames while the vehicle is moving. Further, the electronic control unit determines a change in position of the object of interest in the omnidirectional image frames as the vehicle is moving and determines a distance to the object of interest based on the change of position of the vehicle and the change in position of the object of interest in the omnidirectional image frames.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware.

However, one of ordinary skill in the art, based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
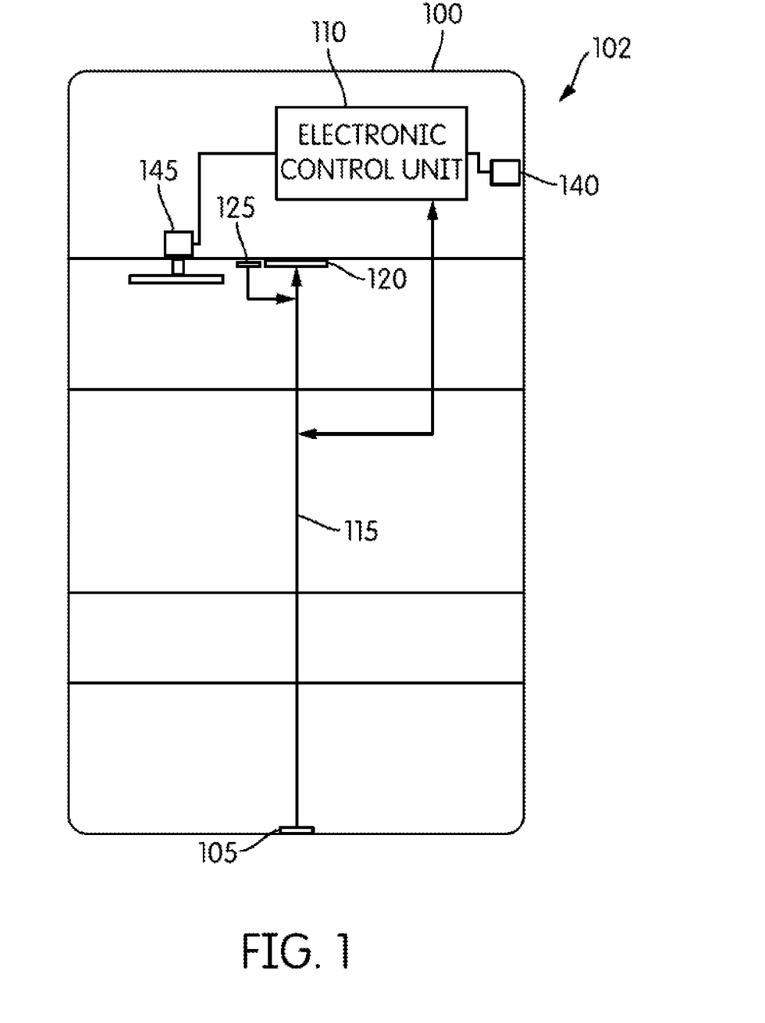
FIG. 1 is a block diagram of a vehicle equipped with an object position measurement system.

FIG. 1 illustrates a vehicle 100 equipped with an object position measurement system 102 according to one embodiment. The vehicle 100 includes an omnidirectional camera 105 (e.g., a fisheye lens camera), an electronic control unit (ECU 110), a vehicle communication bus 115 (e.g., a CAN bus), a display 120, and an user interface 125. The omnidirectional camera 105 is communicatively coupled to the ECU 110, whereby the ECU 110 accesses a plurality of omnidirectional images (i.e., omnidirectional image frames) captured with the omnidirectional camera 105. The ECU 110 processes the plurality of images at predetermined intervals of time and records the plurality of images and associated data based, at least in part, on a distance travelled by the vehicle 100. In addition, the ECU 110 transforms the omnidirectional images to rectilinear images (i.e., rectilinear image frames) and sends the rectilinear images to the display 120 for viewing by the driver of the vehicle. The vehicle communication bus 115 communicatively couples the ECU 110 with the display 120 along with other vehicle systems. For example, the vehicle communication bus 115 enables communication between the ECU 110, the display 120, the user interface 125, and other electronic control units in the vehicle 100. In some constructions, the display 120 and the user interface 125 are integrated into a single device, such as, for example, a touchscreen display. As a consequence, a driver of the vehicle 100 may input commands directly into the display 120 via the user interface 125. As described in detail below, the user interface 125 may receive input from the driver that indicates objects of interest in the display 120. In other embodiments, the display 120 and the user interface 125 are separate stand-alone input and output devices to provide communication between the driver and the ECU 110.

Some embodiments of the object position measurement system 102 also include one or more vehicle sensors 140 that indicate position and movement of the vehicle 100. For example, the vehicle 100 may include a steering angle sensor, a wheel position or wheel speed sensor, and a global positioning system (GPS) indicator. The vehicle sensors 140 enable the ECU 110 to be able to detect position, heading, and motion of the vehicle 100 based on movement information provided by the vehicle sensors 140. In addition, the ECU 110 is configured to calculate the position and a change of position over time based on the movement information. In addition, the ECU 110 may be communicatively coupled to one or more vehicle control devices 145, such as, for example, a steering wheel, a throttle, and a braking system. Using these vehicle control devices 145, the ECU 110 may perform automated driving maneuvers based on the position of the vehicle 100 and the position of objects around the vehicle 100 that are analyzed by the object position measurement system 102.

Figure 2:
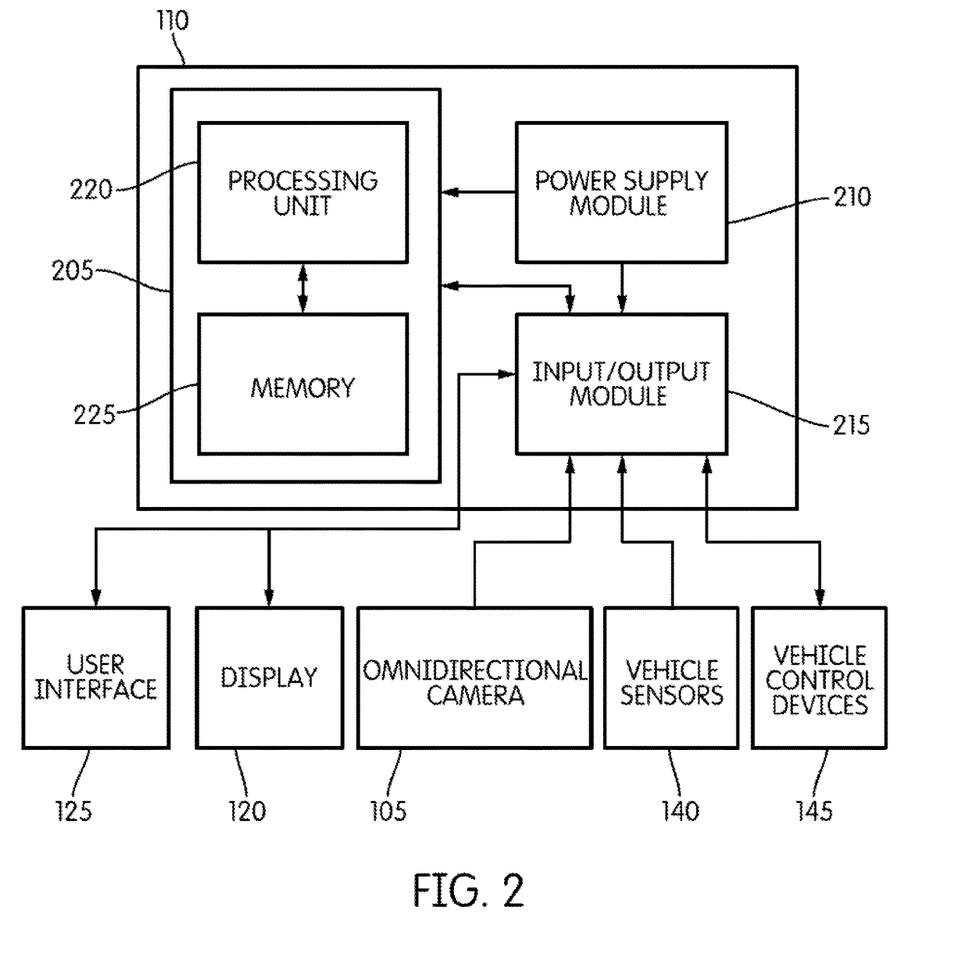
FIG. 2 is a block diagram of an electronic control unit for the object position measurement system of FIG. 1.

FIG. 2 is a block diagram of the ECU 110. The ECU 110 includes a plurality of electrical and electronic components that provide power, operation control, and protection to the components and modules within the ECU 110 and/or the omnidirectional camera 105. For example, the ECU 110 includes, among other things, a controller 205 (such as a programmable electronic microprocessor, microcontroller, or similar device), a power supply module 210, and an input/output module 215. The controller 205 includes, among other things, a processing unit 220 and a memory 225. The processing unit 220 is communicatively coupled to the memory 225 and executes instructions which are capable of being stored on the memory 225. The controller 205 is configured to retrieve from memory 225 and execute, among other things, instructions related to the control processes and method described herein. In other embodiments, the ECU 110 includes additional, fewer, or different components. It should be noted that the ECU 110 may be implemented in several independent electronic control units each configured to perform specific functions listed herein. Additionally, the ECU 110 may contain sub-modules that input specific types of sensor data and perform related processes. For example, a video analysis module may input a video stream from the omnidirectional camera 105, transform the image into rectilinear format, recognize objects and features in the image, track objects and features within the image, and send data outputs from these processes to other ECUs or sub-modules.

The ECU 110, among other things, is configured to transform portions of an omnidirectional image received from the omnidirectional camera 105 into rectilinear image frames. For example, in the embodiment of FIG. 2, the input/output module 215 receives the omnidirectional images from the omnidirectional camera 105 and sends the omnidirectional images to the controller 205 for image processing. The controller 205 then processes and transforms the omnidirectional images. The ECU 110 may transform the omnidirectional images to rectilinear image frames by means of the transformation method disclosed by U.S. patent application Ser. No. 14/808,144, the entire contents of which is incorporated herein by reference. The ECU 110 transmits the transformed images to the display 120 either via the vehicle communication bus 115 or another communications link between the ECU 110 and the display 120. In addition, the input/output module 215 may receive commands from the user interface 125 identifying a region of interest of the displayed image. The region of interest represents a portion of the omnidirectional image that is determined, by the ECU 110 and/or the driver, to contain an object of interest.

The user interface 125, the ECU 110, the sub-modules, the additional ECUs, the vehicle sensors 140, and the vehicle control devices 145 may be linked through one or more communication modules on the vehicle communication bus 115 and/or directly connected via the input/output module 215. In some embodiments, the user interface 125 communicates by means of a protocol such as J1939 or CAN bus for communicating with the input/output module 215. In other embodiments, the user interface 125 communicates with the input/output module 215 under other suitable protocols depending on the needs of the specific application. In some embodiments, the input/output module 215 inputs information directly using dedicated signal lines from the various controls and sensors.

Figure 3:
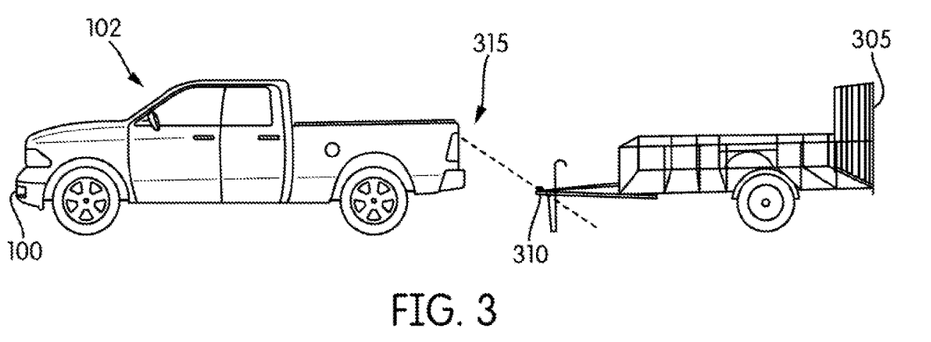
FIG. 3 is a diagram of the vehicle with the object position measurement system of FIG. 1 identifying an object of interest with a rearview omnidirectional camera.
Figure 4:
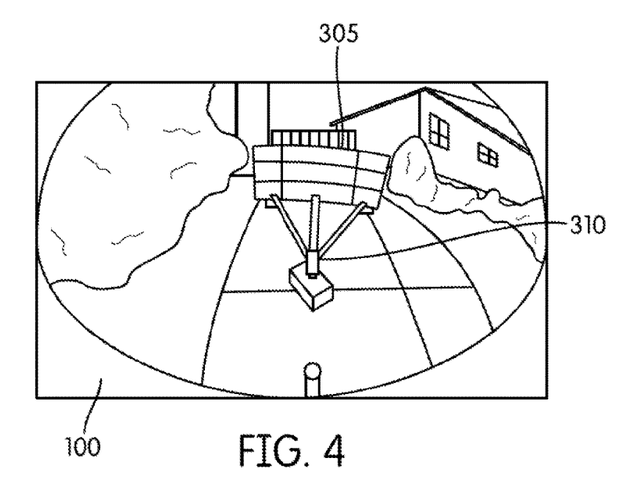
FIG. 4 is an omnidirectional image of the object of interest from the omnidirectional camera of FIG. 3

FIG. 3 is an illustration of the vehicle 100 including the object position measurement system 102 and a trailer 305. In this example, the trailer 305 includes a trailer hitch 310. The trailer hitch 310 is an object of interest for the ECU 110. In this case, the ECU 110 has identified the trailer hitch 310 as an object in which the vehicle 100 is going to align. A line of sight 315 extends from the omnidirectional camera 105 to the trailer hitch 310. FIG. 4 is a rear-view from the vehicle 100 with the omnidirectional camera 105. As illustrated, the trailer hitch 310 occupies a position in the omnidirectional image, which is detected by the ECU 110 as a pixel position or as a set of coordinates (e.g., a vertical coordinate and a horizontal coordinate). As the vehicle 100 approaches the trailer 305, the position of the trailer hitch 310 moves in the omnidirectional image to a new pixel position or set of coordinates. The change in position is detected and an amount of change is determined by the ECU 110. However, the distance and position of the trailer hitch 310 relative to the vehicle 100 is not known based solely on the omnidirectional image or on the change of position of the trailer hitch 310 in the omnidirectional image. Further, the change in position of the trailer hitch 310 may appear larger or smaller depending on the location of the trailer hitch 310 within the omnidirectional image due to non-linear effects in the omnidirectional image. The ECU 110 performs the transformation of at least a portion of the omnidirectional image that contains the object of interest prior to calculating the change of position of the detected object to reduce or eliminate these non-linear effects.

Figure 5:
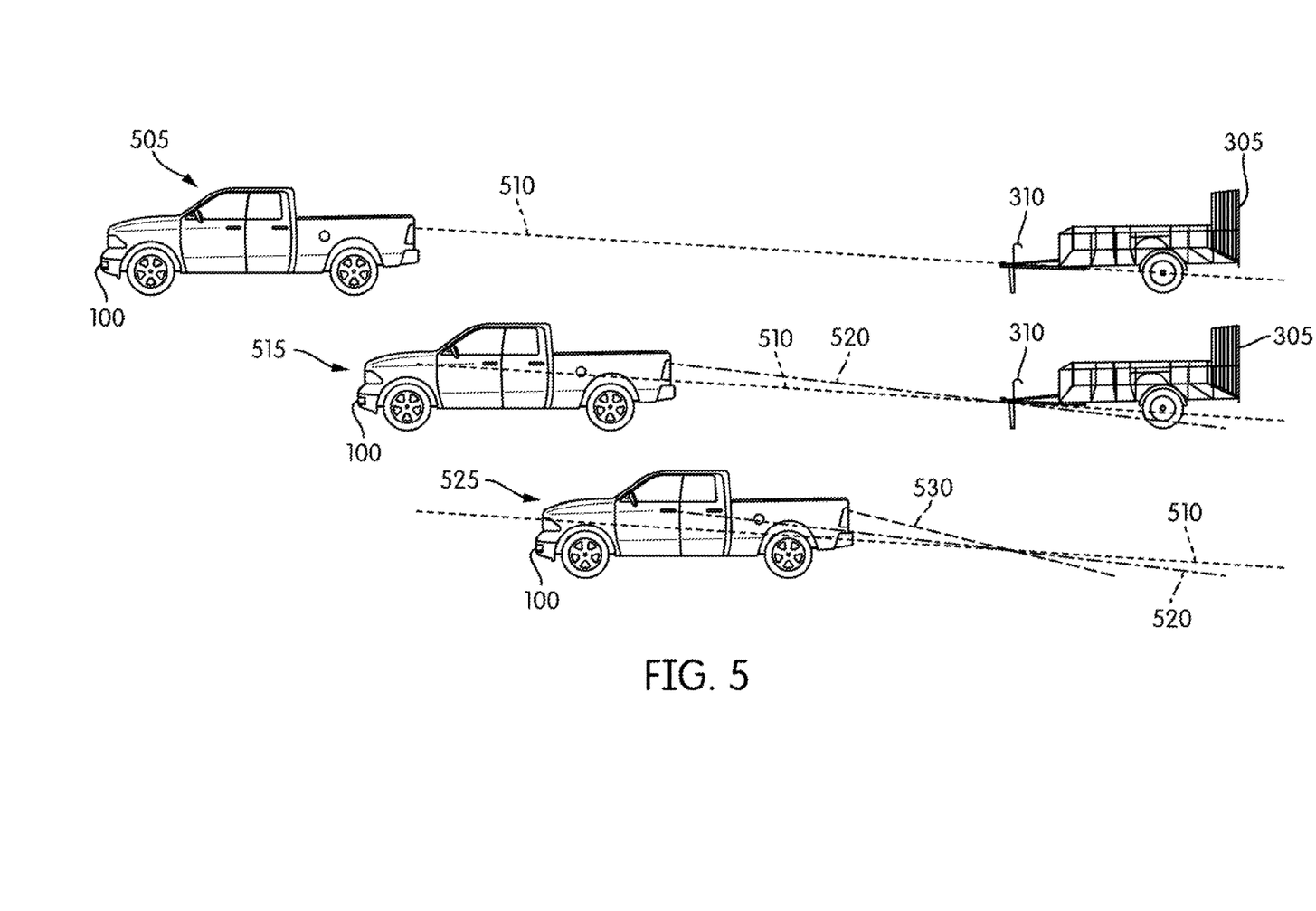
FIG. 5 is a diagram of lines of sight from the omnidirectional camera on the vehicle to the object of interest of FIG. 3.

FIG. 5 illustrates changes in lines of sight between the omnidirectional camera 105 and the trailer hitch 310 as the vehicle 100 approaches the trailer 305. In the upper example 505, a line of sight 510 extends from the omnidirectional camera 105 to the trailer hitch 310. In the middle example 515, a line of sight 520 extends from the omnidirectional camera 105 to the trailer hitch 310. In the bottom example 525, a line of sight 530 extends from the omnidirectional camera 105 to the trailer hitch 310. The line of sight 510 is also depicted in the middle example 515 and the bottom example 525 to illustrate a change in angle between the line of sight 510, the line of sight 520, and the line of sight 530. As the change in angle occurs, the location of the trailer hitch 310 (e.g., the pixel location) in the omnidirectional image changes. This change is tracked by the ECU 110.

Figure 6:
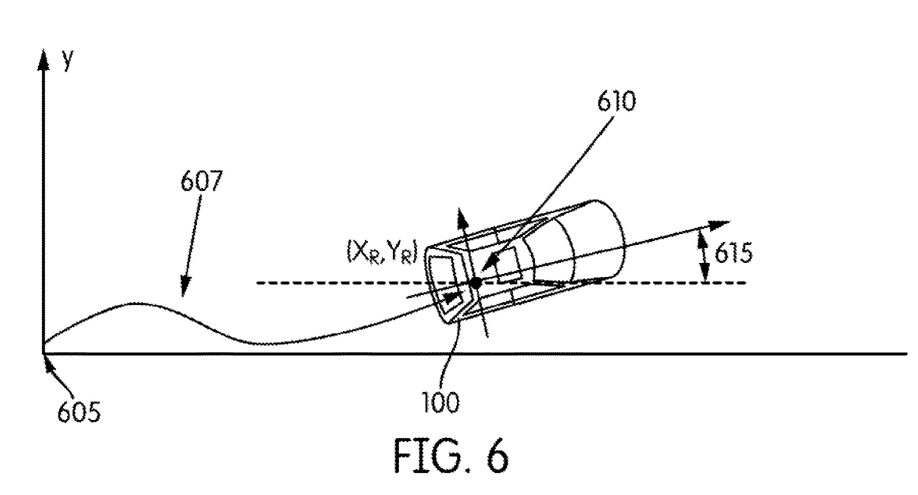
FIG. 6 is a diagram of a ground coordinate system (GCS) in reference to the vehicle of FIG. 1.

FIG. 6 is a graph depicting a world coordinate system with the vehicle 100. Based on an initial reference point 605, the ECU 110 tracks a current position 610 and movement path 607 of the vehicle 100 based on movement data (e.g., direction of movement and distance of movement) read from the vehicle communication bus 115. The ECU 110 uses the wheel speed sensors, the steering angle sensor, and other sensors on the vehicle 100 to track the amount of movement in any given direction. At predefined time intervals, the ECU 110 determines a vehicle pose (e.g., the position and direction of the vehicle with respect to the world coordinate system). For example, the ECU 110 may determine and store in memory 225 a y-distance ($y_R$) and an x-distance ($x_R$) from the initial reference point 605 as well as a yaw angle 615 (e.g., the direction the vehicle 100 is facing). The ECU 110 determines the current position 610 and movement of the vehicle 100 at the same time as the ECU 110 is processing omnidirectional images from the omnidirectional camera 105. As a consequence, the ECU 110 is able to match the current position 610 and movement data with a sequence of omnidirectional images from the omnidirectional camera 105.

Figure 7:
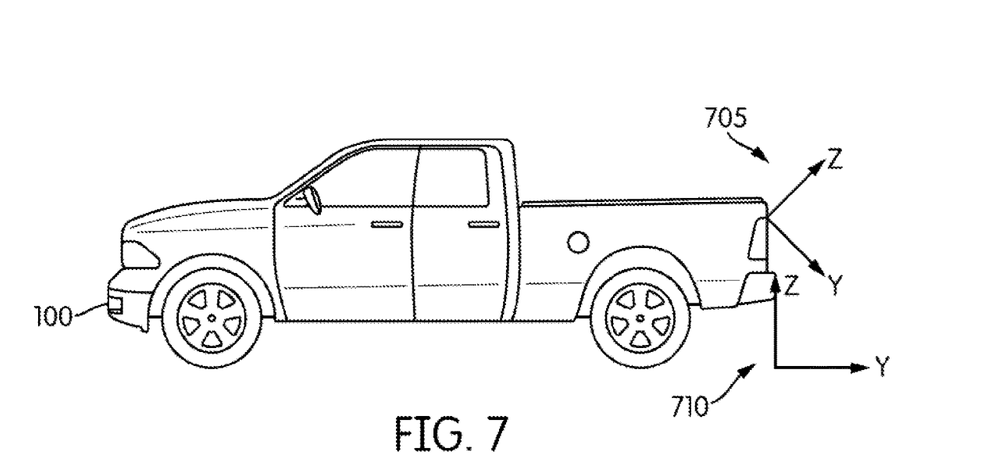
FIG. 7 is a diagram of a relationship between the GCS in reference to the vehicle with a optical coordinate system (OCS) in reference to the omnidirectional camera of FIG. 1.

In order to compare information from the omnidirectional image and the movement data of the vehicle 100, a translation of systems of reference established. FIG. 7 illustrates an optical coordinate system (OCS) 705 with respect to the omnidirectional camera 105 and a ground coordinate system (GCS) 710 with respect to the vehicle 100. Since the GCS 710 also describes the world coordinate system with a simple translation of origin to the vehicle 100, the GCS 710 rather than the world coordinate system will be referenced throughout this disclosure. The OCS 705 has an origin of reference at the optical aperture of the omnidirectional camera 105. A z-axis extends upward and behind at a 45 degree angle from the vehicle 100 and a y-axis extends downward and behind at a −45 degree angle from the vehicle 100. In contrast, a z-axis for the GCS 710 extends perpendicular to the vehicle 100 and a y-axis for the GCS 710 extends parallel with the vehicle 100. These coordinate systems may differ in alignment depending on the alignment of the omnidirectional camera 105 with respect to the vehicle 100 as well as the intrinsic and extrinsic parameters of the omnidirectional camera 105.

The ECU 110 determines a relationship between the GCS 710 and the OCS 705 systems. In some embodiments, during manufacture of the vehicle 100, the ECU 110 is calibrated to define this relationship. For example, a visual test pattern may be input via the omnidirectional camera 105. In such a case, the ECU 110 analyzes the input test pattern in reference to known values (e.g., distances) of the test pattern. In this way, the ECU 110 aligns the OCS 705 and the GCS 710. However, over time, the relationship between the OCS 705 and the GCS 710 may change. For example, if the vehicle 100 experiences changes in height due to, for example, changes in tire pressure or high load conditions, the relationship between the OCS 705 and the GCS 710 may change. To adjust for the changes, the ECU 110 may perform additional calibrations between the OCS 705 and the GCS 710 after manufacture of the vehicle 100. For example, the ECU 110 may perform a calibration using visual odometry at predetermined intervals, for example, upon every startup of the vehicle 100. This type of calibration may be based on detected objects in the omnidirectional image rather than on a visual test pattern. For example, a ground plane may be detected by the ECU 110 and the relationship between the OCS 705 and the GCS 710 may be adjusted based on the position of the ground plane in the omnidirectional image. Since an omnidirectional camera pose (e.g., a position and direction of the omnidirectional camera) is determined in reference to the OCS 705, a calibration also adjusts the omnidirectional camera pose.

Figure 8:
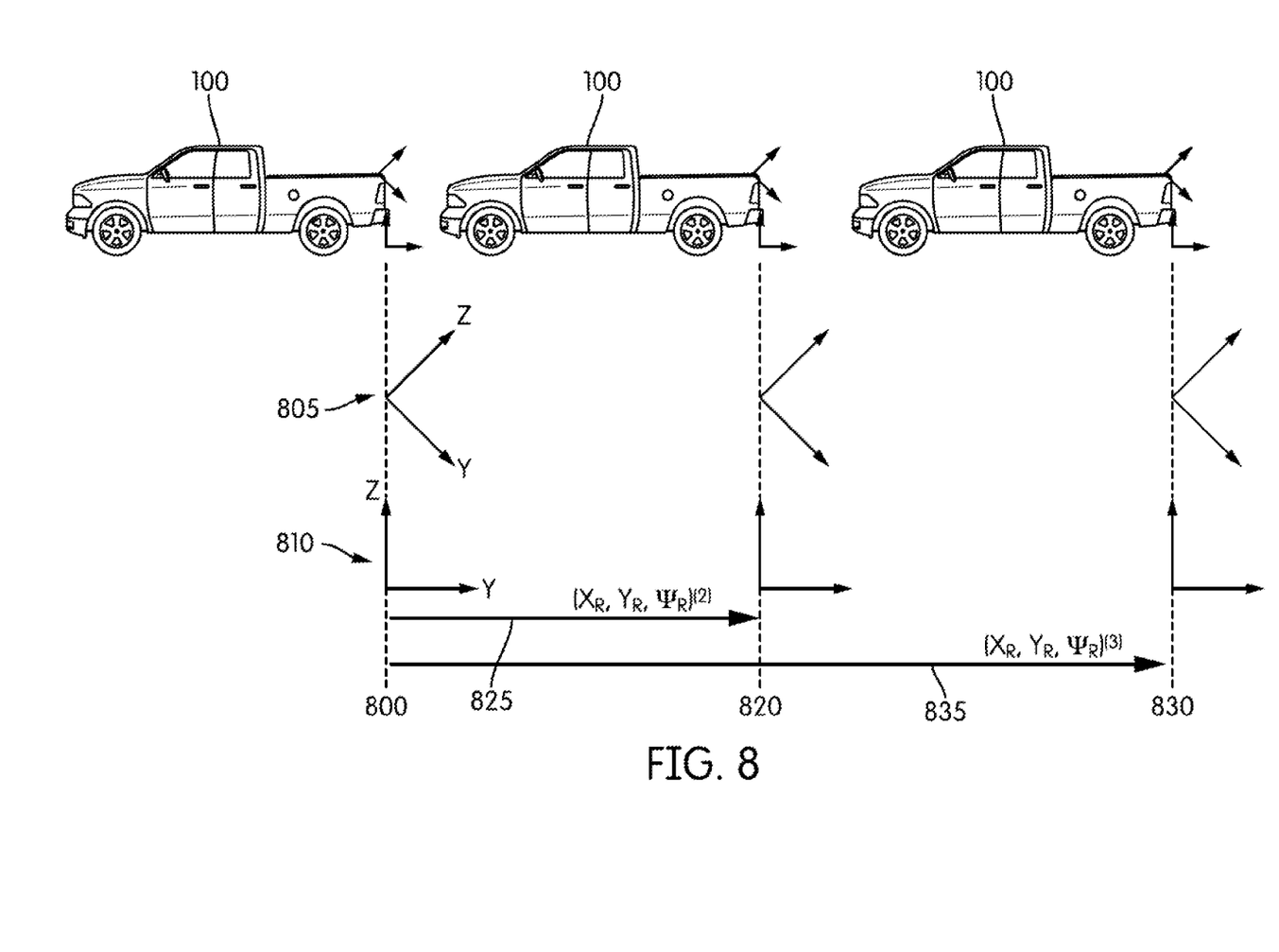
FIG. 8 is a diagram of a transformation between the GCS and the OCS of FIG. 7 over a period of time intervals.

FIG. 8 illustrates a sequence of positions of the vehicle 100 while the vehicle 100 is moving in a reverse direction. At a first time 800, the ECU 110 inputs an omnidirectional image frame by which the ECU 110 generates OCS positional coordinates 805 (i.e., optical positional coordinates) in reference to the OCS 705. At this same time, the ECU 110 inputs GCS positional coordinates 810 (i.e., ground positional coordinates) in reference to the GCS 710 based on information from sensors of the vehicle 100. The OCS positional coordinates 805 and the GCS positional coordinates 810 are stored in memory 225 with a time stamp attached. The time stamp is later used to synchronize the OCS positional coordinates 805 and the GCS positional coordinates 810. At a second time 820, the vehicle has moved a distance 825 in reverse that can be measured in reference to the GCS 710. The ECU 110 inputs the GCS positional coordinates 810 and an omnidirectional image frame at the second time 820. The ECU 110 stores the information in memory 225 with a time stamp indicating the second time 820. Similarly, at a third time 830 indicating that the vehicle 100 has moved a distance 835, the ECU 110 stores the OCS positional coordinates 805 and the GCS positional coordinates 810 in memory 225 with a time stamp indicating the third time 830.

Figure 9:
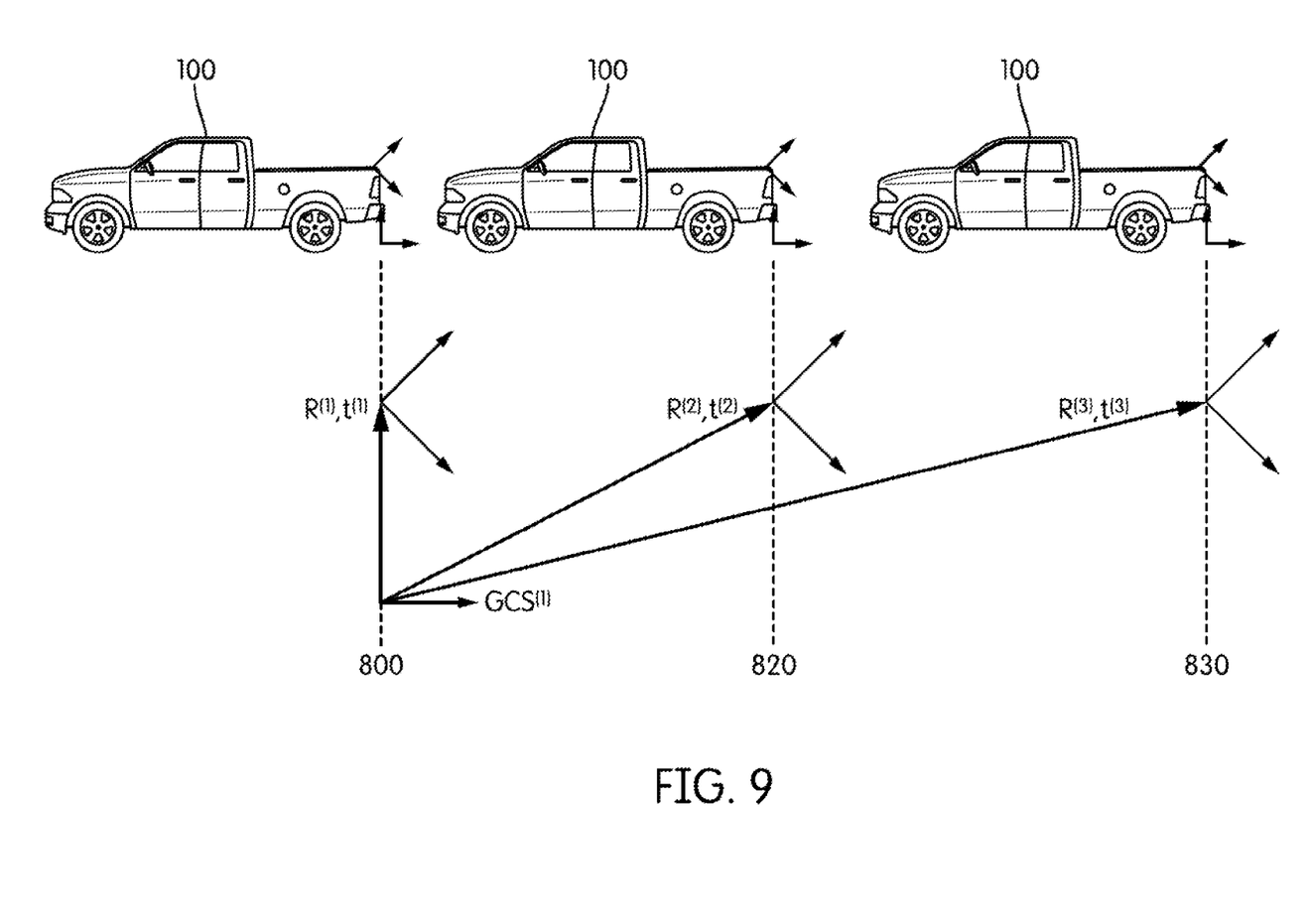
FIG. 9 is a diagram of the transformation between the GCS and the OCS of FIG. 7 based on an omnidirectional camera pose over a period of time intervals.

FIG. 9 is another illustration of the sequence of positions of the vehicle 100 described in reference to FIG. 8. In this embodiment, the ECU 110 transforms the GCS positional coordinates 810 at each given time interval to the OCS positional coordinates 805 at that same time interval. For example, at the first time 800, the ECU 110 reads the GCS positional coordinates 810 and based on the relationship between the OCS 705 and the GCS 710 (e.g., as determined by calibration), the ECU 110 transforms the GCS positional coordinates 810 into OCS positional coordinates 805. This information is captured in the omnidirectional camera pose $(R^{(1)}, t^{(1)})$. At the second time 820, the ECU 110 transforms the GCS positional coordinates 810 to OCS positional coordinates 805 with the omnidirectional camera pose $(R^{(2)}, T^{(2)})$. Similarly, at the third time 830, the ECU 110 transforms the GCS positional coordinates 810 into OCS positional coordinates 805 with the omnidirectional camera pose $(R^{(3)}, t^{(3)})$.

Figure 10A:
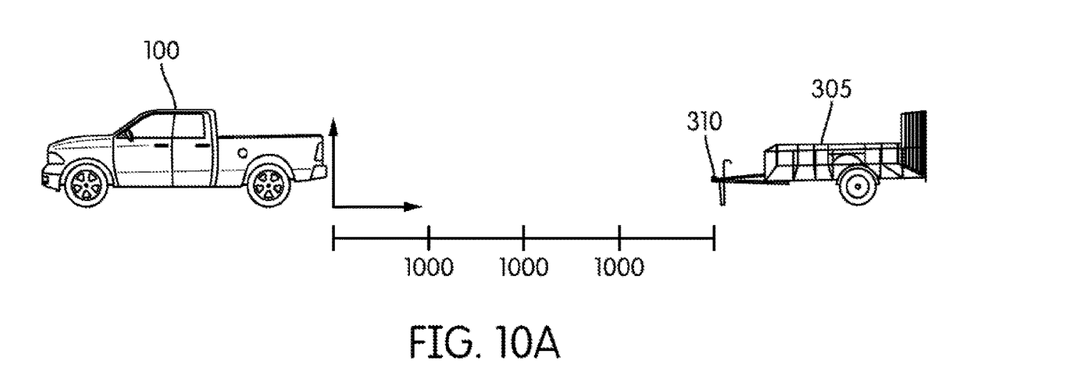
FIGS. 10A and 10B illustrate a method of estimating an objects position with the object position measurement system of FIG. 1 in reference to the GCS.
Figure 10B:
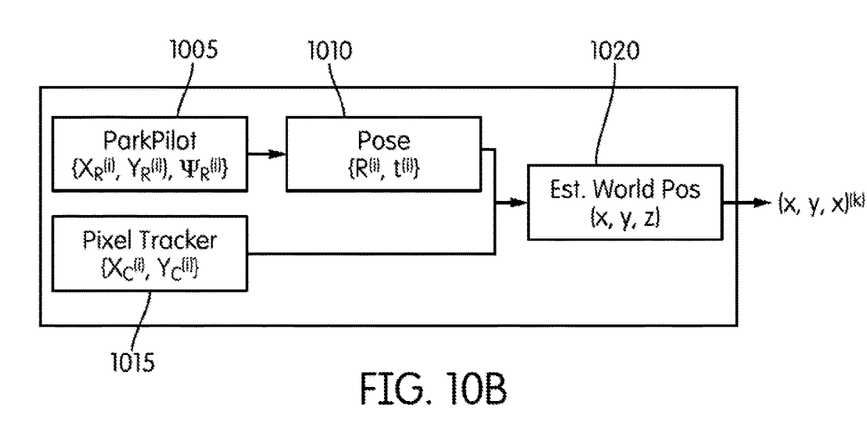

FIG. 10A illustrates that at each time interval 1000 the ECU 110 performs a transformation illustrated in FIG. 10B. The time interval 1000 may be predetermined and adjusted based on the application or processing speed of the ECU 110. The time interval 1000 may also be based on a distance travelled rather than a predetermined time. At each time interval 1000, the ECU 110 determines the GCS positional coordinates 810 from the vehicle communication bus 115 (step 1005). For each time interval 1000, an omnidirectional camera pose $(R^{(i)}, t^{(i)})$ is determined (step 1010). The omnidirectional camera pose $(R^{(i)}, t^{(i)})$ defines the position of the omnidirectional camera 105 in terms of OCS 705. A pixel tracker, as explained in detail below, generates OCS positional coordinates 805 for an object of interest based on a pixel location in the omnidirectional image (step 1015). The OCS positional coordinates 805 and the pose $(R^{(i)}, t^{(i)})$ are processed by the ECU 110 for each respective time interval 1000 and an estimated world position $(x,y,z)^{(k)}$ of the object of interest is determined for that respective time interval 1000 (step 1020).

Figure 11A:
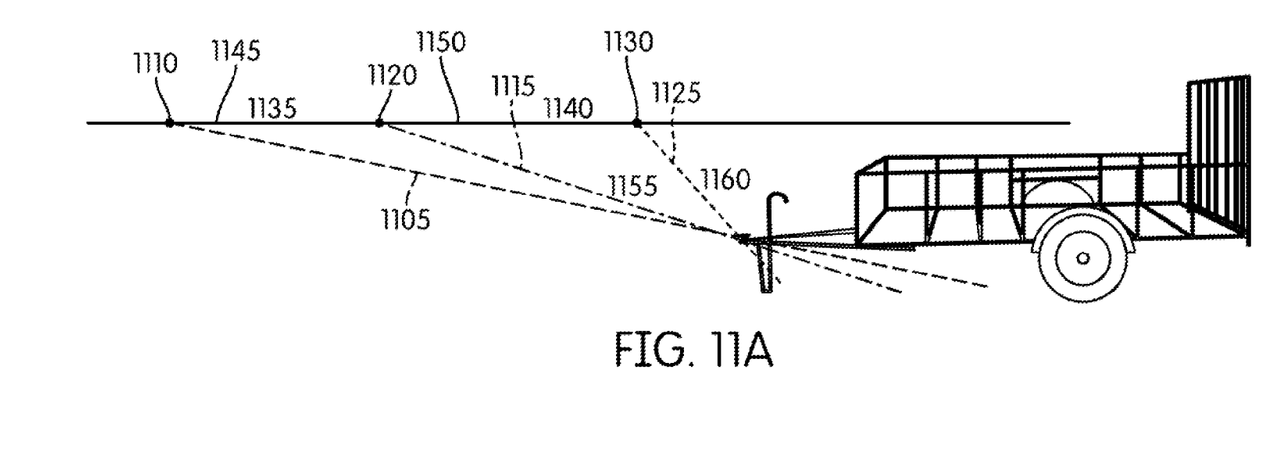
FIG. 11A is a diagram of a common intersection of lines of sight from the omnidirectional camera to the object of interest of FIG. 3.

As the vehicle 100 approaches the trailer hitch 310 (i.e., the object of interest), the trailer hitch 310 will move pixel positions in the omnidirectional image. This corresponds to a change in the line of sight from the omnidirectional camera 105 to the trailer hitch 310 as explained above. In FIG. 11A, a first line of sight 1105 corresponds to a first position 1110 of the vehicle 100, a second line of sight 1115 corresponds to a second position 1120 of the vehicle 100, and a third line of sight 1125 corresponds to a third position 1130 of the vehicle 100. A first distance 1135 between the first position 1110 and the second position 1120 is determined by the ECU 110 using the GCS positional coordinates 810. Similarly, a second distance 1140 is determined by the ECU 110 using the GCS positional coordinates 810. A first angle 1145 and a second angle 1150 may be calculated based on an amount of change of pixel position in the rectilinear image. The ECU 110 calculates a separation distance 1155 between the vehicle 100 and the trailer hitch 310 using known geometric relationships between the first distance 1135, the second distance 1140, the first angle 1145, and the second angle 1150. Similarly, the ECU 110 calculates a separation distance 1160 between the vehicle 100 and the trailer hitch 310 at the third position 1130. Since the ECU 110 may calculate the separation distance 1155 and the separation distance 1160 at the first distance 1135 and the second distance 1140 when the first distance 1135 and the second distance 1140 are very small (e.g., at very short time intervals), the separation distance 1155, 1160 may be estimated nearly continuously as the vehicle 100 approaches the trailer 305. Based on the separation distance 1155, 1160, the ECU 110 outputs the relative positions of the vehicle 100 and the trailer 305 to other vehicle systems including ECUs that control automated vehicle maneuvers. Using the separation distance 1155, 1160, and the GCS positional coordinates 810, the ECUs can perform automated alignment of the trailer hitch 310 with the vehicle 100.

Figure 11B:
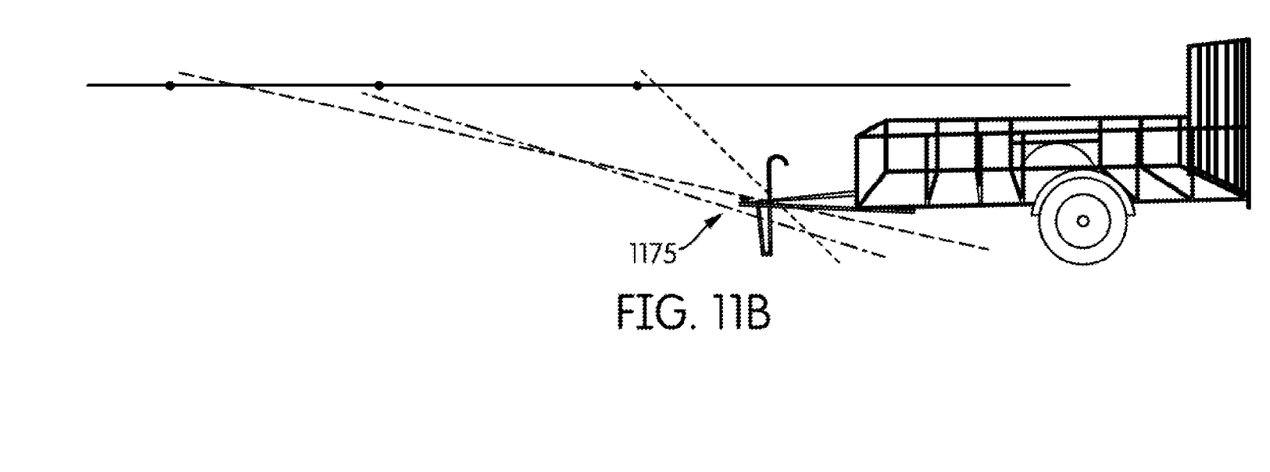
FIG. 11B is a diagram of the uncertainties in determining the common intersection point of FIG. 11A.
Figure 12:
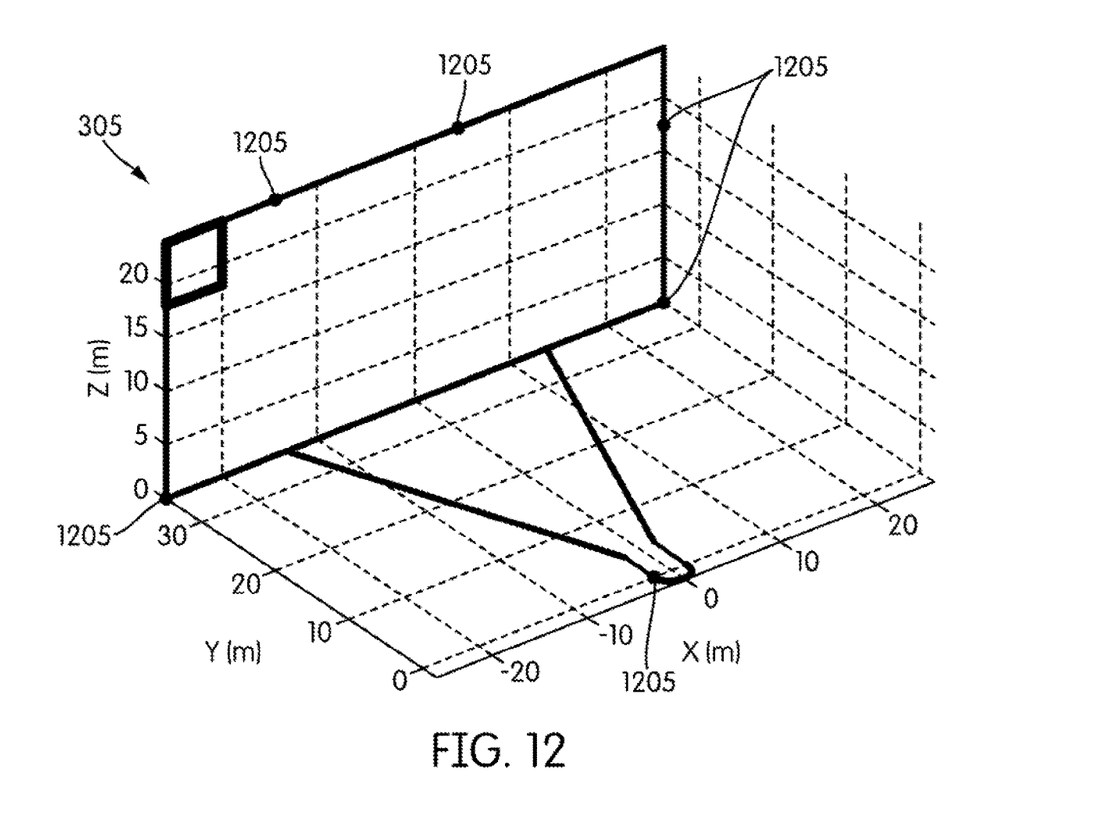
FIG. 12 is a grid diagram of multiple identified points on the object of interest of FIG. 3.

In practice, small uncertainties in OCS positional coordinates 805, such as exact pixel location of the object of interest, produces uncertainties in the point of intersection 1175 of the lines of sight as illustrated in FIG. 11B. These uncertainties may result in uncertainties or errors in the estimated distance between the vehicle 100 and the trailer 305 especially when using a single intersection point for the object of interest. To reduce the uncertainty, the ECU 110 may calculate positions of multiple points (i.e., features) of an object of interest or multiple objects of interest simultaneously. FIG. 12 illustrates a portion of the trailer 305 with multiple detection points 1205 on the object of interest. When the ECU 110 imports the omnidirectional image, an object detection routine determines the multiple detection points 1205. Once recognized, the multiple detection points 1205 are tracking using an object tracking routine of the ECU 110. As a consequence, each of the multiple detection points 1205 is processed to determine the distance between the vehicle 100 and that detection point. Once the ECU 110 has detected and processed the multiple detection points 1205, the ECU 110 may compare the multiple detection points 1205 with each other to reduce any individual errors or uncertainties related to individual detection points. For example, the ECU 110 may run a bundle adjustment algorithm to refine distance predictions. In this way, the estimation of distance by the ECU 110 is optimized over multiple detection points 1205. The object detection of the ECU 110 may detect various objects programmed into memory 225. For example, the ECU 110 may detect the trailer 305, a ground plane, a tree, a pole, a curb, another vehicle, a pedestrian, and others. As described above, the ECU 110 may detect multiple points on these various objects or a single point on the object. In either case, the ECU 110 determines the distance to the object using the methods described herein.

Figure 13:
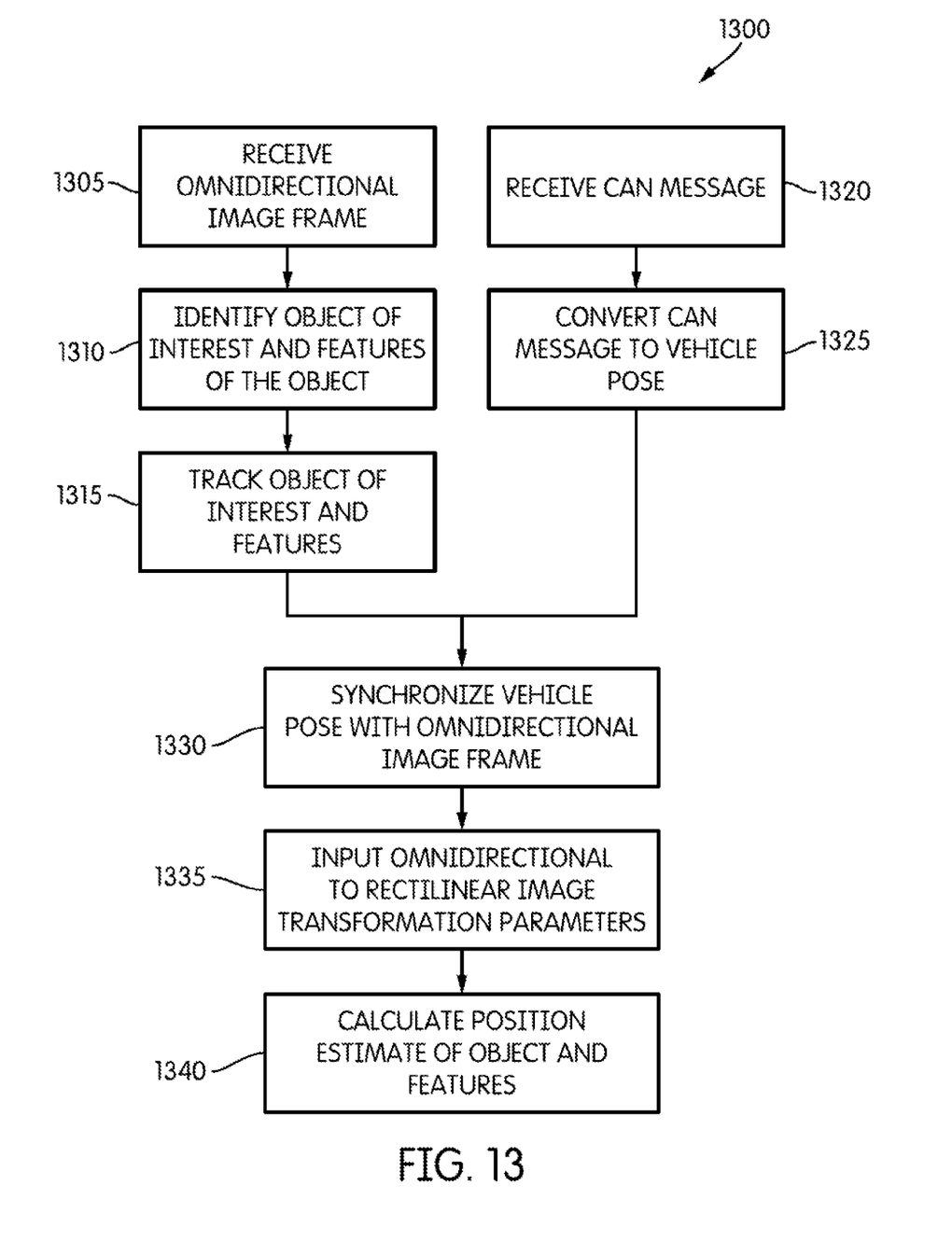
FIG. 13 is a flowchart of a method of determining a position of an object using the object position measurement system of FIG. 1.
Figure 14:
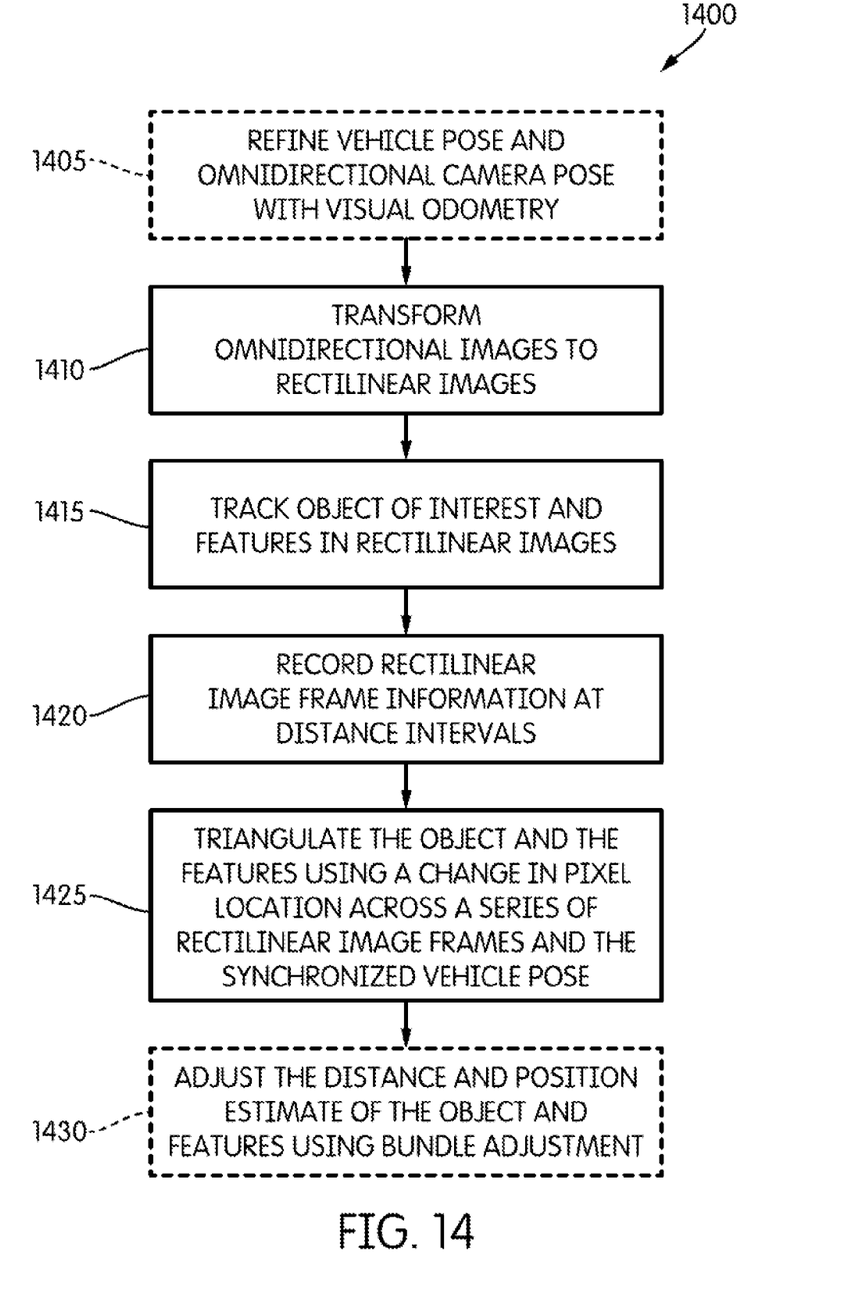
FIG. 14 is another flowchart of the method of determining a position of an object using the object position measurement system of FIG. 1.

FIGS. 13 and 14 are flowcharts of the method of determining distance and position of the object using the object position measurement system 102. FIG. 13 illustrates general steps of the method including which input parameters are received and processed by the ECU 110. A omnidirectional image frame is input into the ECU 110 from the omnidirectional camera 105 (step 1305). The ECU 110 detects one or more objects within the omnidirectional image frame and classifies the one or more objects as one or more objects of interest. In particular, the ECU 110 identifies a pattern in the omnidirectional image and compares the pattern to a predetermined set of objects to classify the object as a specific object type. Once an object is classified as an object of interest, the ECU 110 determines and tracks one or more features of the object of interest in subsequent omnidirectional image frames input into the ECU 110 from the omnidirectional camera 105 (step 1310). Frame information is appended to each omnidirectional image frame including the types of tracked objects, the features of the objects, and a location (e.g., which pixel) of each of the features and/or objects. Simultaneously, a message from the vehicle communication bus 115 containing the movement data of the vehicle 100 is received (step 1320). This message contains a can-message index (e.g., index k') attached to each piece of movement data to allow the ECU 110 to track when the message is received. The ECU 110 converts the can message to a vehicle pose at each can-message index (step 1325). The ECU 110 synchronizes the vehicle pose with each omnidirectional image frame received (step 1330). The ECU 110 inputs omnidirectional to rectilinear image transformation parameters and converts the frame information to the rectilinear image (step 1335). The ECU 110 calculates a position estimate of the object and features based on the synchronized vehicle pose, the transformed frame information, and the camera pose over a series of omnidirectional image frames (step 1340).

FIG. 14 illustrates additional steps of the method of determining distance and position of the object using the object position measurement system 102. Based on the inputs described in reference to FIG. 13, the ECU 110 may optionally first refine the vehicle pose and the omnidirectional camera pose with visual odometry (step 1405). Next, the ECU 110 transforms a series of omnidirectional image frames or at least a portion of the omnidirectional image frames containing the object of interest to a series of rectilinear image frames (step 1410). The ECU 110 tracks the object of interest and features across the rectilinear image frames and converts the frame information corresponding to the object of interest in the omnidirectional image frames to rectilinear image frame information (step 1415). The ECU 110 records the rectilinear image frame information at distance intervals (step 1420). The distance intervals are determined by the ECU 110 based on a predetermined distance travelled using the movement data of the vehicle 100. The ECU 110 triangulates the object and the features using a change in pixel location across the series of rectilinear image frames and the synchronized vehicle pose (step 1425). In other words, the ECU 110 determines a change in position of the object of interest across a first rectilinear image frame and a second rectilinear image frame. Then, the ECU 110 determines, based on the change in position across the first rectilinear image frame and the second rectilinear image frame and a change in the vehicle pose corresponding to these rectilinear image frames, the distance and position of the object of interest. The distance is determined using trigonometric relationships between the change in position in the rectilinear image frames and the change in vehicle pose. In the case of multiple points on the object of interest, the ECU 110 also determines distance to these multiple points in a similar manner. The ECU 110 may process the distance calculations for these multiple points in parallel and simultaneously with the distance calculation of the object of interest. Once the distance is known, the position of the object is determined in reference to the GCS 710. Then optionally, the ECU 110 may adjust the distance and position estimate of the object using the multiple points on the object of interest with a bundle adjustment algorithm (step 1430). The bundle adjustment algorithm refines the estimate based on averaging values between the multiple points.

The methods described in reference to FIGS. 13 and 14 may be used for various objects of interest. As described above, the ECU 110 may first use object recognition capabilities to detect objects of interest. For example, the ECU 110 may compare objects in the omnidirectional image to known objects in memory 225 to identify and/or classify the object. In this case, the ECU 110 may use the known object to help identify the multiple points of interest on the object. However, the ECU 110 may also identify an object of interest based on a user selection. In particular, a driver of the vehicle 100 may select an object in the user interface 125, such as, for example, the trailer hitch 310. The ECU 110 detects the user selection and based on image recognition identifies the relevant object. In such an example, the ECU 110 may operate the methods described in FIGS. 13 and 14 using a single point (i.e., the object of interest selected by the driver). Conversely, if the ECU 110 recognizes the image, the ECU 110 may use multiple points of interest based on the known object to determine an adjusted distance and position of the selected object of interest.

Thus, the invention provides, among other things, a system and a method for determining distance and position of an object of interest based on vehicle movement data and change in position of the object of interest in an omnidirectional image from an omnidirectional camera on a vehicle. Various features and advantages of the invention are set forth in the following claims.

What is claimed is:

1. A method of locating a position of an object with an omnidirectional camera affixed to a vehicle, the method comprising:
   receiving movement data of the vehicle from vehicle sensors indicative of a change of position of the vehicle;
   receiving a plurality of omnidirectional image frames of one or more stationary objects with an omnidirectional camera;
   identifying an object of interest from the one or more stationary objects in the omnidirectional image frames,
   tracking the object of interest in the omnidirectional image frames, with an electronic control unit, while the vehicle is moving;
   determining a change in position of the object of interest in the omnidirectional image frames as the vehicle is moving; and
   determining a distance to the object of interest relative to the vehicle based on the change of position of the vehicle and the change in position of the object of interest in the omnidirectional image frames.

2. The method of locating a position of an object according to claim 1, wherein receiving movement data of the vehicle includes receiving a direction of movement and a distance of movement from a vehicle communication bus.

3. The method of locating a position of an object according to claim 1, the method further comprising:
   determining a position of the vehicle based on ground positional coordinates of the vehicle in reference to a ground coordinate system;
   determining a position of the object of interest based on optical positional coordinates of the object of interest in reference to an optical coordinate system;
   transforming the determined position of the vehicle based on ground positional coordinates to a position of the vehicle based on optical positional coordinates in reference to the optical coordinate system.

4. The method of locating a position of an object according to claim 1, the method further comprising:
   transforming the omnidirectional image frames to a plurality of rectilinear image frames;
   determining a plurality of positions of the object of interest in the rectilinear image frames; and
   determining a change in the positions of the object of interest in the rectilinear image frames while the vehicle is moving.

5. The method of locating a position of an object according to claim 1, wherein determining a distance to the object of interest based on the change of position of the vehicle from the movement data and the change in position of the object of interest in the omnidirectional image includes triangulating the movement data of the vehicle and the change in position of the object of interest.

6. The method of locating a position of an object according to claim 3, the method further comprising:
calibrating a relationship between the ground coordinate system and the optical coordinate system.

7. The method of locating a position of an object according to claim 1, the method further comprising transforming the omnidirectional image frames to rectilinear image frames.

8. The method of locating a position of an object according to claim 1, wherein the object of interest is classified as a plurality of optical positional coordinates, and wherein tracking the object of interest in the omnidirectional image includes tracking the optical positional coordinates, and wherein determining a change in position of the object of interest in the omnidirectional image as the vehicle is moving includes determining a change in the optical positional coordinates.

9. The method of locating a position of an object according to claim 8, further comprising performing a bundle adjustment on the coordinate points.

10. The method of locating a position of an object according to claim 1, wherein the object of interest is identified by a user input.

11. The method of locating a position of an object according to claim 1, wherein the object of interest is identified by a touchscreen.

12. The method of locating a position of an object according to claim 1, wherein the object of interest is identified by
analyzing the omnidirectional image frames for a pattern;
comparing the pattern to a predetermined set of objects; and
classifying the pattern as a specific object type from the predetermined set of objects.

13. The method of locating a position of an object according to claim 1, wherein the object of interest is one selected from the group consisting of another vehicle, a curb, a tree, a pole, and a ground plane.

14. The method of locating a position of an object according to claim 1, further comprising automatically maneuvering the vehicle based on the position of the object of interest.

15. An object locating system for locating a position of an object with an omnidirectional camera affixed to a vehicle, the system comprising:

at least one vehicle sensor configured to indicate a change of position of the vehicle;
an omnidirectional camera;
a user interface configured to display video information to a driver of the vehicle; and an electronic control unit configured to
receive a plurality of omnidirectional image frames from the omnidirectional camera including an omnidirectional image of a one or more stationary objects,
receive movement data of the vehicle from the at least one vehicle sensor indicative of a change of position of the vehicle;
identifying an object of interest from the one or more stationary objects in the omnidirectional image frames,
tracking the object of interest in the plurality of omnidirectional image frames while the vehicle is moving;
determining a change in position of the object of interest in the omnidirectional image frames as the vehicle is moving; and
determining a distance to the object of interest based on the change of position of the vehicle and the change in position of the object of interest in the omnidirectional image frames.

16. The object locating system according to claim 15, wherein the at least one vehicle sensor includes a wheel speed sensor and a steering angle sensor.

17. The object locating system according to claim 15, wherein the electronic control unit is further configured to triangulate the change of position of the vehicle and the change in position of the object of interest in the omnidirectional image frames to determine a distance to the object of interest.

18. The object locating system according to claim 15, wherein the electronic control unit is further configured to transform the omnidirectional image to a rectilinear image before calculating distance to the object of interest.

19. The object locating system according to claim 15, further comprising a touchscreen configured to receive an input from a driver identifying the object of interest to the electronic control unit.

20. The object locating system according to claim 15, wherein the object of interest is one selected from the group consisting of another vehicle, a curb, a tree, a pole, and a ground plane.

* * * * *